United States Patent Office 3,329,677
Patented July 4, 1967

3,329,677
N-BENZHYDRYLOXYPHTHALIMIDES AND PRYI-DINEALDEHYDE O-BENZHYDRYLOXIMES
Edward L. Schumann, Kalamazoo, Mich., assignor to The Upjohn Company, Kalamazoo, Mich., a corporation of Delaware
No Drawing. Filed Mar. 3, 1964, Ser. No. 349,141
7 Claims. (Cl. 260—240)

This invention relates to novel compounds and processes for their preparation. More particularly the invention is directed to novel N-benzyhydryloxyphthalimides, pyridinealdehyde O-benzhydryloximes and novel methods for their synthesis.

The compounds embraced by the invention comprise those represented by the following structural formulae:

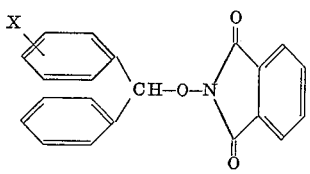

I wherein X is selected from the group consisting of hydrogen and halogen; and

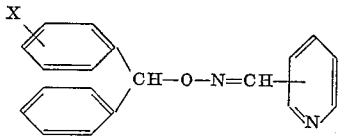

II wherein X has the same meaning as above, and the acid addition salts thereof.

The compounds included within Formula I are prepared by reacting N-hydroxyphthalimide with a compound represented by the Formula IV.

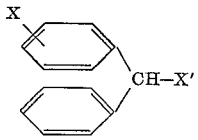

IV wherein X has the same meaning as above and X' is selected from the group consisting of chlorine and bromine, in the presence of an acid acceptor, for example, sodium hydroxide, potassium hydroxide, pyridine, triethylamine, etc. The reaction can advantageously be carried out at elevated temperatures by heating the reactants in an inert organic solvent, for example, dimethylformamide; preferably the temperature of the reaction mixture should be maintained between about 80° and about 100° C. The reaction time can vary from between about ½ to about 2 hours. The desired product is isolated from the reaction mixture by conventional procedures, e.g., by pouring the reaction mixture into water, in which case it separates, solidifies on standing and is isolated by filtration. The material thus obtained can be purified, if desired, by conventional procedures such as crystallization and the like, to yield the wanted product of Formula I, e.g., N-benzhydryloxyphthalimide, N-(4-chlorobenzhydryloxy)phthalimide, etc.

N-benzhydryloxyphthalimide and the ring halo-substituted derivatives thereof of Formula I, above, can be converted by hydrazinolysis (e.g., by reaction with hydrazine hydrate) to O-benzhydrylhydroxylamine and its corresponding ring halo-substituted analogues represented by the Formula III

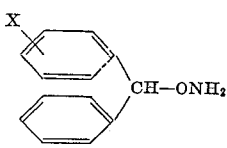

III wherein X has the same meaning as above. The reaction can be advantageously carried out at elevated temperatures by warming the reactants in an inert organic solvent, for example, a mixture of dimethylformamide and methanol, between about 50° and about 70° C. After acidification of the reaction mixture, for example, with hydrochloric or sulfuric acid, the phthalylhydrazide formed is removed, e.g., by filtration; the filtrate is evaporated, treated with an alkali, for example, sodium or potassium hydroxide, and the residue extracted with an inert solvent, e.g., ether, benzene, etc., and the extracts washed with water to remove any remaining unreacted hydrazine. The material thus obtained can be purified, if desired, by conventional procedures such as crystallization and the like, to yield the product of Formula III sought, e.g., O-benzhydrylhydroxylamine, O - 4 - chlorobenzhydrylhydroxylamine, etc. These compounds (III) can be converted to their stable protonates (acid addition salts) on neutralization with acids, for example, hydrochloric, hydrobromic, sulfuric, etc.

The compounds of Formula III, preferably as their acid addition salts, by reaction with a known compound of the formula V

V are converted to the novel corresponding compounds of Formula II, above. Compounds of Formula V that can be satisfactorily employed in this reaction include 2-pyridinealdehyde, 3-pyridinealdehyde and 4-pyridinealdehyde. The reaction, advantageously, is carried out between about 10° and about 50° C. The reactants (III and V) can be suspended in water or dissolved in an inert solvent, illustratively, ethonal. When the reactant (III) is employed in the form of an acid addition salt, it is preferred that an alkali metal alkanoate, e.g., sodium acetate, be included in the reaction mixture. The products (II) are separated from the reaction mixture and recovered by conventional procedures, for example, by solvent extraction and can be purified, if desired, for example, by recrystallization. These compounds (II) are readily converted to their corresponding acid addition salts; e.g., by treating said compounds dissolved in an inert solvent, for example ether, with an ethereal solution of, for example, hydrogen chloride or hydrogen bromide to yield, e.g., 4-pyridinealdehyde O-benzhydryloxime hydrochloride (or hydrobromide), 2-pyridinealdehyde O-4-chlorobenzhydryloxime hydrochloride (or hydrobromide), etc. The acid addition salts of Formula II are separated from the reaction mixture and recovered in pure form by conventional procedures, for example, by recrystallization and the like.

The compounds of Formula IV above, many of which are known, can be prepared by known procedures, e.g., by the process of Hamlin et al., J. Amer. Chem. Soc. 71, 2731.

The novel compounds represented by Formula II, above, exist either in the nonprotonated (free base) form or the protonated form depending upon the pH of the environment. They form stable protonates (acid addition salts) on neutralization with acids, for example, hydrochloric, hydrobromic, sulfuric, nitric, triocyanic, fluosilicic, methanesulfonic, and cyclohexanesulfamic acids, and the like. These acid addition salts are useful in upgrading the free base. The corresponding free base is useful as an acid acceptor in neutralizing undesirable acidity or in absorbing an acid as it is formed in a chemical reaction, for example, a dehydrohalogenation reaction in which hydrogen and chlorine, bromine, or iodine, are removed from vicinal carbon atoms.

The thiocyanic acid addition salts of the compounds of Formula II when condensed with formaldehyde, form resinous materials useful as pickling inhibitors according to U.S. Patents 2,425,320 and 2,606,155. The fluosilicic acid addition salts of the aforesaid compounds (II) are useful as mothproofing agents according to U.S. Patents 1,915,334 and 2,075,359.

The acid addition salts of the compounds of Formula II can be converted to their free bases by treatment with aqueous alkali hydroxide, e.g., sodium or potassium hydroxide, and the liberated free bases can be converted to other acid addition salts by neutralization with an acid, for example, any of the acids set forth above. Acid addition salts can also be formed by metathesis.

The compounds of Formula II both in their nonprotonated form and their protonated form with pharmacologically acceptable acids, for example, hydrochloric, hydrobromic, sulfuric, nitric, methanesulfonic, and cyclohexanesulfamic acids and the like, exhibit several pharmacological activities. They are central nervous system depressants and can be used for producing sedation in mammals and animals, e.g., mice, rats and birds (e.g., poultry). These compounds (II) also possess anti-inflammatory, anti-parasitic and anti-fungal properties, which render them useful in the treatment of ailments due to inflammation, parasites and fungi in mammals and animals, e.g., mice, rats and birds (e.g., poultry).

The compounds of Formula I have pharmacological activities, e.g., as adrenergic blocking agents and tryptophan-5-hydroxylation (liver) inhibitors. They are central nervous system depressants and can be employed for producing sedation in mammals and animals, e.g., mice, rats and birds (e.g., poultry).

The compounds embraced by Formula I are additionally useful as starting materials for preparing the intermediates of Formula III, which are in turn converted to the pharmacologically active pyridinealdehyde O-benzhydryloximes (II).

The invention may be more fully understood by the following examples which embody the best manner known for carrying out the invention.

EXAMPLE 1

A. N-benzhydryloxphthalimide (I)

A stirred solution of 32.6 g. (0.2 mole) of N-hydroxyphthalimide, 40.5 g. (0.2 mole) of benzhydryl chloride (IV), and 44.5 g. (0.44 mole) of triethylamine in 300 ml. of dimethylformamide was slowly heated to 90° C. during an hour, maintained at this temperature for ½ hour, cooled and poured into 1 liter of cold water. The oily precipitate, which solidified on standing, was recrystallized from 95% ethanol to give 17.4 g. (26% yield) of white prisms of N-benzhydryloxyphthalimide (I), melting at 168 to 169° C.

*Analysis.*—Calcd. for $C_{21}H_{15}NO_3$: C, 76.58; H, 4.59; N, 4.25. Found: C, 76.49; H, 4.54; N, 4.48.

B. O-benzhydrylhydroxylamine hydrochloride (III)

A solution of 18.4 g. (0.056 mole) of N-benzhydryloxyphthalimide (I) of part A in 90 ml. of dimethylformamide and 300 ml. of methanol was warmed to 60° C., treated with 6.1 g. (0.123 mole) of hydrazine hydrate and allowed to stand for 3 hours. The mixture was stirred, acidified to pH 2 with 2 N hydrochloric acid, filtered to remove phthalhydrazide, and the filtrate was evaporated to dryness under reduced pressure. The semisolid residue was treated with 100 ml. of 2 N sodium hydroxide, the mixture was extracted with ether, and the combined ether extracts were washed with two portions of water to remove any remaining hydrazine.

The ether extracts were dried over anhydrous potassium carbonate. Treatment with ethereal hydrogen chloride precipitated the product, which was recrystallized from isopropyl alcohol to give 5.1 g. (39% yield) of pure O-benzhydrylhydroxylamine hydrochloride (III) which decomposed at 179 to 180° C.

*Analysis.*—Calcd. for $C_{13}H_{13}NO \cdot HCl$: C, 66.24; H, 5.99; N, 5.94; Cl, 15.04. Found: C, 66.07; H, 5.92; N, 6.12; Cl, 15.33.

C(1). 4-pyridinealdehyde O-benzhydryloxime hydrochloride (II)

A solution of 10.7 g. (0.1 mole) of 4-pyridinealdehyde (V) in 100 ml. of water was stirred and treated with a slurry of 23.6 g. (0.1 mole) of O-benzhydrylhydroxylamine hydrochloride (III) of part B in 100 ml. of water. A solution of 8.2 g. (0.1 mole) of sodium acetate in 20 ml. of water was then added. Ethanol was added to the stirred mixture until solution was complete; the solution was refrigerated for about 15 hours. The precipitated semisolid was separated by decanting the supernatant liquid. A solution of the semisolid in 1 liter of anhydrous ether was treated with etheral hydrogen chloride to give a gummy hydrochloride. Recrystallization from a mixture of methanol and anhydrous ether gave 22.2 g. (68% yield) of pure 4-pyridinealdehyde O-benzhydryloxime hydrochloride (II) with a melting point of 185 to 186° C.

*Analysis.*—Calcd. for $C_{19}H_{16}N_2O \cdot HCl$: C, 70.25; H, 5.28; N, 8.63; Cl, 1097. Found: C, 69.93; H, 4.95; N, 8.26; Cl, 11.08.

On treatment with sodium or potassium hydroxide, the free base, 4-pyridinealdehyde O-benzhydryloxime, is obtained.

Following the above procedure of parts C(1) but substituting 3-pyridinealdehyde for the 4-pyridinealdehyde employed therein, yields 3-pyridinealdehyde O-benzhydryloxime hydrochloride.

C(2). 2-pyridinealdehyde O-benzhydryloxime (II)

A solution of 11.8 g. (0.05 mole) of O-benzhydrylhydroxylamine hydrochloride (III) of part B in 250 ml. of absolute ethanol was treated first with a solution of 5.4 g. (0.05 mole) of 2-pyridinealdehyde (V) in absolute ethanol, then with a solution of 4.1 g. (0.05 mole) of sodium acetate in 30 ml. of water. The mixture was stirred at about 25° C. for ½ hour, then refrigerated. No precipitate appeared, therefore the solution was poured into 3 l. of cold water. The mixture was extracted with four 500-ml. portions of ether. The combined ether extracts were dried over anhydrous magnesium sulfate, evaporated to dryness, and the residue was recrystallized from methanol to give 10 g. (70% yield) of white prisms of 2-pyridinealdehyde O-benzhydryloxime (II) with a melting point of 78 to 80° C.

*Analysis.*—Calcd. for $C_{19}H_{16}N_2O$: C, 79.14; H, 5.59; N, 9.72. Found: C, 79.15; H, 5.52; N, 9.85.

On neutralizing the thus-produced compound with hydrochloric acid and sulfuric acid, respectively, the corresponding acid addition salt of 2-pyridinealdehyde O-benzhydryloxime (II) is obtained.

EXAMPLE 2

A. N-(4-chlorobenzhydryloxy)phthalimide (I)

Thionyl chloride (238 g.; 2 moles) was slowly added to 109 g. (0.5 mole) of 4-chlorobenzhydrol; a vigorous reaction occurred. The mixture was then heated under reflux for 1 hour. Excess thionyl chloride was removed under reduced pressure; 200 ml. of benzene was added to the residue and removed in the same manner. Distillation of the residual oil gave 106 g. (90% yield) of 4-chlorobenzhydryl chloride (IV) with a boiling point of 112 to 114° C. at 0.025 mm.; $n_D^{24}$ 1.6005. The literature [J. Amer. Chem. Soc. 50, 1807 (1928)] reported a boiling point of 172 to 173° C. at 6 mm.

Following the above procedure but substituting 4-bromobenzhydrol for 4-chlorobenzhydrol, yields 4-bromobenzhydryl chloride (IV).

Following the above procedure but substituting 3-chlorobenzhydrol (prepared as in J. Amer. Chem. Soc. 77, 4007) for 4-chlorobenzhydrol, yields 3-chlorobenzhydryl chloride (IV).

A stirred solution of 106 g. (0.45 mole) of 4-chlorobenzhydryl chloride (IV), 73 g. (0.45 mole) of N-hydroxyphthalimide, and 99 g. (0.98 mole) of triethylamine in 650 ml. of dimethylformamide was slowly heated to 90° C. during an hour, maintained at that temperature for ½ hour, cooled and poured into 2.2 l. of cold water. The precipitated oil solidified on standing and was separated by filtration and washed with water and a small amount of ethanol. Recrystallization from isopropyl alcohol gave 61.3 g. (38% yield) of white, granular crystals melting at 106 to 108° C. A second recrystallization gave pure N-(4-chlorobenzhydryloxy) phthalimide (I) with a melting point of 107 to 108° C.

*Analysis.*—Calcd. for $C_{21}H_{14}ClNO_3$: C, 69.33; H, 3.88; N, 3.85; Cl, 9.75. Found: C, 69.17; H, 3.55; N, 3.85; Cl, 9.82.

Following the procedure above but substituting 4-bromobenzhydryl chloride for 4-chlorobenzhydryl chloride, yields N-(4-bromobenzhydryloxy)phthalimide (I).

Following the above procedure but substituting 3-chlorobenzhydryl chloride for 4-chlorobenzhydryl chloride, yields N-(3-chlorobenzhydryloxy)phthalimide (I).

B. O-4-chlorobenzhydrylhydroxylamine hydrochloride (III)

A solution of 50 g. (0.14 mole) of N-(4-chlorobenzhydryloxy) phthalimide (I) of part A in 250 ml. of dimethylformamide and 1 liter of methanol was warmed to 60° C., treated with 13 g. (0.28 mole) of hydrazine hydrate, and allowed to stand for 3 hours. The mixture was rendered acidic with 2 N hydrochloric acid and filtered, and the filtrate was concentrated to a volume of 150 ml. under reduced pressure. The residue was made strongly alkaline with sodium hydroxide and extracted with ether. After washing with water, the combined ether extracts were dried over anhydrous potassium carbonate and treated with ethereal hydrogen chloride to precipitate 26 g. (70% yield) of pure O-4-chlorobenzhydrylhydroxylamine hydrochloride (III), with a melting point of 170 to 171° C. A sample recrystallized from a mixture of isopropyl alcohol and anhydrous ether melted at the same temperature.

*Analysis.*—Calcd. for $C_{13}H_{12}ClNO \cdot HCl$: C, 57.79; H, 4.85; N, 5.19; Cl, 26.25. Found: C, 57.74; H, 4.64; N, 5.27; Cl, 26.02.

Following the above procedure but substituting N-(4-bromobenzhydryloxy)phthalimide for N-(4-chlorobenzhydryloxy)phthalimide, yields O-4-bromobenzhydrylhydroxylamine hydrochloride (III).

Following the above procedure but substituting N-(3-chlorobenzhydryloxy)phthalimide for N-(4-chlorobenzhydryloxy)phthalimide, yields O-3-chlorobenzhydrylhydroxylamine hydrochloride (III).

C. 4-pyridinealdehyde O-4-chlorobenzhydryloxime hydrochloride (II)

A solution of 20 g. (0.074 mole) of O-4-chlorobenzhydrylhydroxylamine hydrochloride (III) of part B in 200 ml. of 50% ethanol was treated with 7.9 g. (0.074 mole) of 4-pyridinealdehyde (V), then with a solution of 8.2 g. (0.1 mole) of sodium acetate in 150 ml. of water. The mixture was stirred at about 25° C. for 2 hours, then refrigerated for about 15 hours. The precipitated oil did not crystallize and the mixture was extracted with ether. The combined ether extracts were dried over anhydrous magnesium sulfate and treated with ethereal hydrogen chloride. The precipitated product was recrystallized from a mixture of 95% ethanol and anhydrous ether to give 22.4 g. (84% yield) of white needles in rosettes of pure 4-pyridinealdehyde O-4-chlorobenzhydryloxime hydrochloride (II) melting at 167 to 169° C.

*Analysis.*—Calcd. for $C_{19}H_{15}ClN_2O \cdot HCl$: C, 63.52; H, 4.49; N, 7.80; Cl, 19.74. Found: C, 63.74; H, 4.40; N, 7.80; Cl, 19.31.

Following the procedure of part C above but substituting O-4-bromobenzhydrylhydroxylamine hydrochloride for O-4-chlorobenzhydrylhydroxylamine hydrochloride, yields 4-pyridinealdehyde O-4-bromobenzhydryloxime hydrochloride (II).

On treating 4-pyridinealdehyde O-4-chlorobenzhydryloxime hydrochloride and 4-pyridinealdehyde O-4-bromobenzhydryloxime hydrochloride with sodium hydroxide or potassium hydroxide, the free bases, 4-pyridinealdehyde O-4-chlorobenzhydryloxime and 4-pyridinealdehyde O-4-bromobenzhydryloxime, are obtained.

Following the above procedure but substituting 2-pyridinealdehyde and 3-pyridinealdehyde for the 4-pyridinealdehyde, yields 2-pyridinealdehyde O-4-chlorobenzhydryloxime hydrochloride, 2-pyridinealdehyde O-4-bromobenzhydryloxime hydrochloride, 3-pyridinealdehyde O-4-chlorobenzhydryloxime hydrochloride, and 3-pyridinealdehyde O-4-bromobenzhydryloxime hydrochloride.

Following the procedure of part C but substituting sulfuric acid for hydrogen chloride, yields 4-pyridinealdehyde O-4-chlorobenzhydryloxime sulfate.

Following the procedure of part C but substituting O-3-chlorobenzhydrylhydroxylamine hydrochloride for O-4-chlorobenzhydrylhydroxylamine hydrochloride, yields 4-pyridinealdehyde O-3-chlorobenzhydryloxime hydrochloride.

Following the procedure of part C but substituting O-3-chlorobenzhydrylhydroxylamine hydrochloride for O-4-chlorobenzhydrylhydroxylamine hydrochloride and 3-pyridinealdehyde for 4-pyridinealdehyde, yields 3-pyridinealdehyde O-3-chlorobenzhydryloxime hydrochloride. Substituting O-3-chlorobenzhydrylhydroxylamine hydrochloride for O-4-chlorobenzhydrylhydroxylamine and 2-pyridinealdehyde for 4-pyridinealdehyde, yields 2-pyridinealdehyde O-3-chlorobenzhydryloxime hydrochloride; replacing O-4-chlorobenzhydrylhydroxylamine hydrochloride with O-3-bromobenzhydrylhydroxylamine hydrochloride yields 4-pyridinealdehyde O-3-bromobenzhydryloxime hydrochloride.

Following the procedure of Example 1, parts A, B and C, but substituting 4-fluorobenzhydryl chloride and 4-iodobenzhydryl chloride for benzhydryl chloride in part A, there are obtained the following compounds: N-(4-fluorobenzhydryloxy)phthalimide, O-4-fluorobenzhydrylhydroxylamine hydrochloride, and 4-pyridinealdehyde O-4-fluorobenzhydryloxime hydrochloride; and N-(4-iodobenzhydryloxy)phthalimide, O-4-iodobenzhydrylhydroxylamine hydrochloride, and 4-pyridinealdehyde O-4-iodobenzhydryloxime hydrochloride, respectively.

I claim:
1. A compound selected from the group consisting of (1) the free base of a compound of the formula

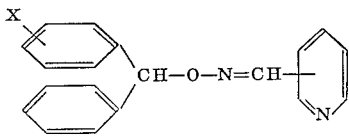

wherein X is selected from the group consisting of hydrogen and halogen, and (2) an acid addition salt thereof.
2. 2-pyridinealdehyde O-benzhydryloxime free base.
3. 2-pyridinealdehyde O-benzhydryloxime hydrochloride.
4. 4-pyridinealdehyde O-benzhydryloxime free base.
5. 4-pyridinealdehyde O-benzhydryloxime hydrochloride.
6. 4-pyridinealdehyde O-4-chlorobenzhydryloxime free base.
7. 4-pyridinealdehyde O-4-chlorobenzhydryloxime hydrochloride.

References Cited

UNITED STATES PATENTS

| | | | |
|---|---|---|---|
| 2,924,604 | 2/1960 | Steinhards et al. | 260—240 X |
| 3,184,452 | 5/1965 | Druey et al. | 260—240 X |
| 3,215,706 | 11/1965 | Lutz | 260—326 |
| 3,226,446 | 12/1965 | Drain et al. | 260—621 |

FOREIGN PATENTS 640,150   5/1964   Belgium.

OTHER REFERENCES

McKay et al.: Canadian Journal of Chemistry, vol. 38, pages 343–345 and 349–351 (1960).
Paquette: Tetrahedon Letters, No. 11, pages 485–488 (1962).
Schumann et al.: J. Med. Chem., vol. 7, pp. 329–334 (May 1964).
German printed application No. 1,149,722 (6/63).

JOHN D. RANDOLPH, *Primary Examiner.*